United States Patent
Bennett et al.

(10) Patent No.: US 7,697,233 B1
(45) Date of Patent: Apr. 13, 2010

(54) DISK DRIVE COMPRISING A SERVO ACCELERATOR IMPLEMENTING STATE SPACE EQUATIONS FOR A PLURALITY OF TASK OBJECTS

(75) Inventors: George J. Bennett, Murrieta, CA (US); Orhan Beker, Aliso Viejo, CA (US); Aswartha Narayana, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 2 days.

(21) Appl. No.: 12/255,542

(22) Filed: Oct. 21, 2008

(51) Int. Cl.
*G11B 21/02* (2006.01)
*G11B 5/55* (2006.01)
*G11B 5/596* (2006.01)

(52) U.S. Cl. .................... 360/75; 360/77.08; 360/78.09

(58) Field of Classification Search .................. None
See application file for complete search history.

(56) References Cited

U.S. PATENT DOCUMENTS

| | | | |
|---|---|---|---|
| 6,101,058 A | 8/2000 | Morris | |
| 6,167,461 A | 12/2000 | Keats et al. | |
| 6,219,729 B1 | 4/2001 | Keats et al. | |
| 6,490,118 B1 | 12/2002 | Ell et al. | |
| 6,490,121 B1 | 12/2002 | Pruett et al. | |
| 6,493,177 B1 | 12/2002 | Ell et al. | |
| 6,542,326 B1 | 4/2003 | Ell et al. | |
| 6,563,665 B1 | 5/2003 | Ell | |
| 6,590,734 B1 | 7/2003 | Ell | |
| 6,604,121 B1 | 8/2003 | Ell et al. | |
| 6,671,121 B1 | 12/2003 | Bradbury et al. | |
| 6,674,605 B1 | 1/2004 | Ell | |
| 6,687,199 B1 | 2/2004 | Tran et al. | |
| 6,958,881 B1 | 10/2005 | Codilian et al. | |
| 6,965,909 B2 | 11/2005 | Jang et al. | |
| 7,031,099 B2 | 4/2006 | Kohso et al. | |
| 7,233,331 B2 | 6/2007 | Kato | |
| 2006/0200732 A1* | 9/2006 | Dobbek et al. | 714/782 |
| 2009/0024828 A1* | 1/2009 | Mar | 711/217 |

* cited by examiner

*Primary Examiner*—William J Klimowicz
*Assistant Examiner*—James L Habermehl

(57) ABSTRACT

A disk drive is disclosed comprising a disk, a head, and an actuator for actuating the head over the disk. The disk drive further comprises a state variable memory for storing a plurality of state variable sets, wherein each state variable set comprises a plurality of state variables and each state variable set corresponds to a task object. A coefficient memory for stores a plurality of coefficient sets, wherein each coefficient set comprises a plurality of coefficients and each coefficient set corresponds to a task object. A task object is executed by initializing a base state register to address a selected one of the state variable sets in the state variable memory, and initializing a base coefficient register to address a selected one of the coefficient sets in the coefficient memory.

18 Claims, 7 Drawing Sheets

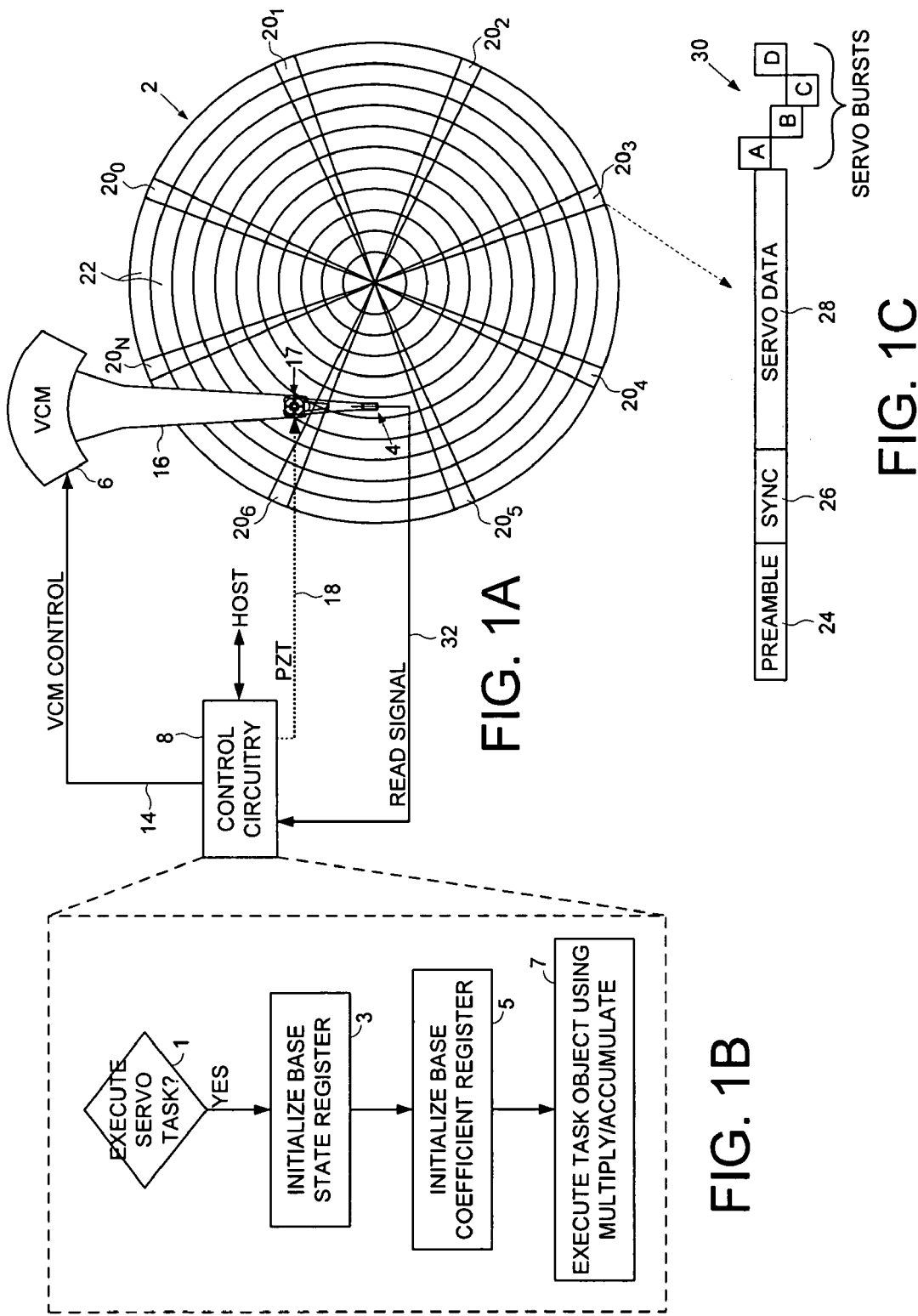

DISK DRIVE COMPRISING A SERVO ACCELERATOR IMPLEMENTING STATE SPACE EQUATIONS FOR A PLURALITY OF TASK OBJECTS

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address and servo bursts) which are read by the head and processed by a servo control system to control the velocity of the actuator arm as it seeks from track to track, and to maintain the head over a target track while performing write/read operations.

BRIEF DESCRIPTION OF THE DRAWINGS

FIG. 1A shows a disk drive according to an embodiment of the present invention comprising a disk, and an actuator (e.g., a voice coil motor) for actuating the head radially over the disk.

FIG. 1B shows a flow diagram according to an embodiment of the present invention wherein a base state register and a base coefficient register are initialized in order to execute a selected servo task object.

FIG. 1C shows a format of an embedded servo sector recorded on the disk according to an embodiment of the present invention.

DETAILED DESCRIPTION OF EMBODIMENTS OF THE INVENTION

FIG. 1A shows a disk drive according to an embodiment of the present invention comprising a disk 2, a head 4, and an actuator (e.g., a voice coil motor (VCM) 6) for actuating the head 4 over the disk 2. The disk drive further comprises a state variable memory for storing a plurality of state variable sets, wherein each state variable set comprises a plurality of state variables and each state variable set corresponds to a task object, and a coefficient memory for storing a plurality of coefficient sets, wherein each coefficient set comprises a plurality of coefficients and each coefficient set corresponds to a task object. The disk drive further comprises control circuitry 8 for generating an actuator control signal by executing the flow diagram of FIG. 1B in order to execute a servo task object.

When a servo task object is selected for execution (step 1), a base state register is intialized to address a selected one of the state variable sets in the state variable memory (step 3). A base coefficient register is intialized to address a selected one of the coefficient sets in the coefficient memory (step 5). The base state register is used to read a first state variable from the selected state variable set, the base coefficient register is used to read a first coefficient from the selected coefficient set, and a multiply/accumulate circuit is used to multiply the first state variable by the first coefficient (step 7).

Figure 1D:
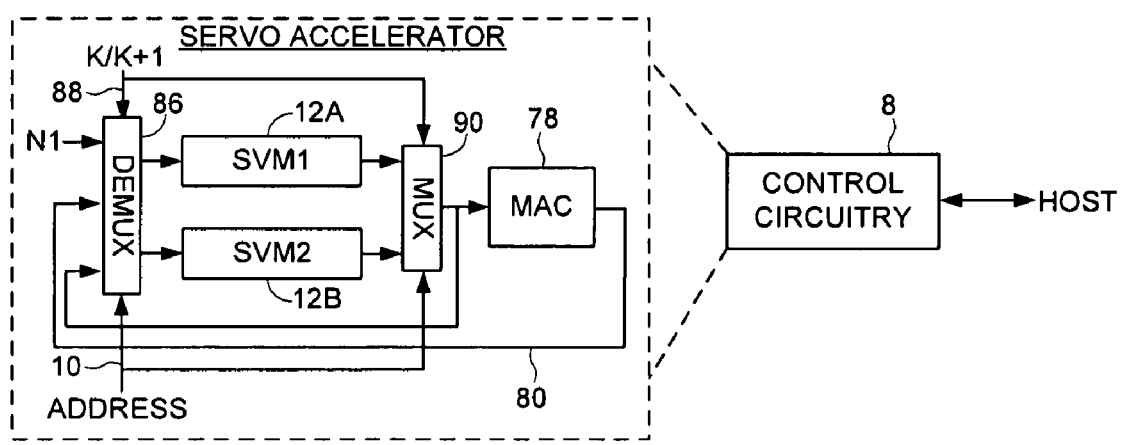
FIG. 1D shows control circuitry according to an embodiment of the present invention including first and second state variable memories SVM1 and SVM2 used to implement a servo accelerator.

FIG. 1D shows an embodiment of the present invention wherein the control circuitry 8 comprises a servo accelerator for executing the servo tasks objects using a dual state variable memory. A memory address 10 is assigned to a first state variable memory (SVM1) 12A, and the memory address 10 is used to read a first state k variable from the SVM1 12A. The first state k variable is stored in a second state variable memory (SVM2) 12B while processing the first state k variable to generate a first state k+1 variable. The first state k+1 variable is stored in the SVM2 12B, and the memory address 10 is assigned to the SVM2 12B so that the first state k+1 variable becomes a second state k variable and the first state k variable becomes a first state k−1 variable. The memory address 10 is used to read the second state k variable and the first state k−1 variable from the SVM2 12B. The second state k variable is stored in the SVM1 12A while processing the second state k variable and the first state k−1 variable to generate a second state k+1 variable. The second state k+1 variable is stored in the SVM1 12A, and the memory address 10 is assigned to the SVM1 12A so that the second state k+1 variable becomes a third state k variable.

In the embodiment of FIG. 1A, the actuator control signal comprises a VCM control signal 14 applied to a VCM 6 which rotates an actuator arm 16 about a pivot in order to actuate the head 4 radially over the disk. In one embodiment, the VCM 6 is a primary actuator that provides coarse positioning of the head 4 which is augmented by a secondary actuator, such as a piezoelectric (PZT) actuator 17, that provides fine positioning of the head 4 in response to a secondary actuator control signal 18.

In the embodiment of FIG. 1A, the disk 2 comprises a plurality of embedded servo sectors $20_0$-$20_N$ that define a plurality of data tracks 22. FIG. 1C shows an example format of a servo sector 20, comprising a preamble 24 for storing a periodic pattern that enables proper gain adjustment and timing synchronization of the read signal, and a sync mark 26 for storing a special pattern used to symbol synchronize to a servo data field 28. The servo data field 28 stores coarse head positioning information, such as a track address, used to position the head over a target data track during a seek operation. Each servo sector $20_i$ further comprises groups of servo bursts 30 (e.g., A, B, C and D bursts), which comprise a number of consecutive transitions recorded at precise intervals and offsets with respect to a data track centerline. The groups of servo bursts 30 provide fine head position information used for centerline tracking while accessing a data track during write/read operations.

When the head 4 passes over the servo sectors $20_0$-$20_N$ the control circuitry 8 processes the read signal 32 to demodulate the servo information into a position error signal (PES). The control circuitry 8 processes the PES using suitable control algorithms and filtering to generate the actuator control signal, such as a VCM control signal 14 or a PZT control signal 18. In one embodiment, the control circuitry 8 comprises a microprocessor for executing firmware algorithms supported by servo accelerator circuitry including the state variable memories SVM1 and SVM2 of FIG. 1D.

Figure 2:
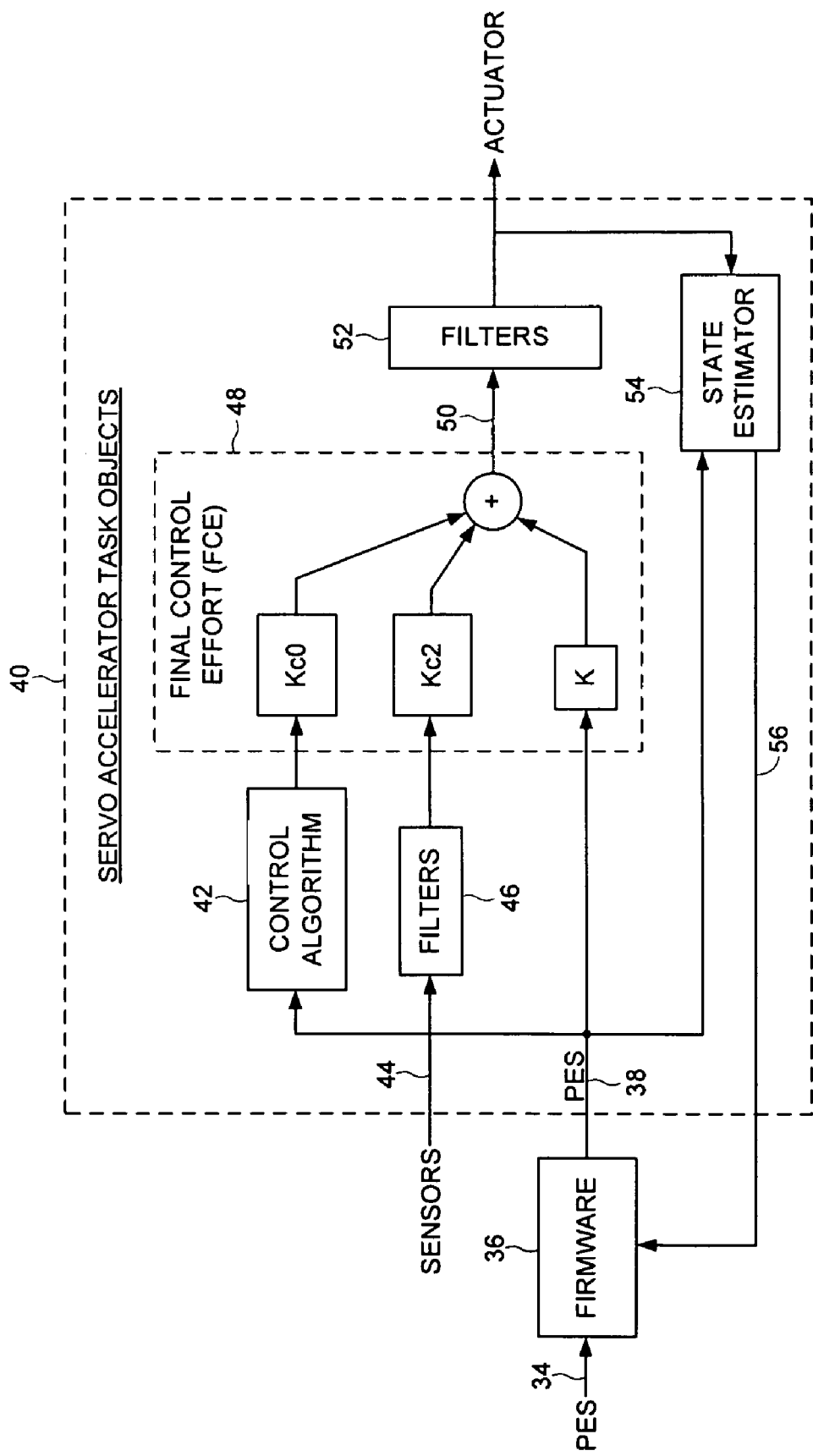
FIG. 2 shows an embodiment of the present invention including servo control firmware and servo accelerator task objects for implementing certain operations in hardware.

FIG. 2 shows example servo accelerator task objects 40 for generating an actuator control signal according to an embodiment of the present invention. A PES signal 34 is generated from reading the servo sectors $20_0$-$20_N$, and firmware 36 performs pre-processing of the PES signal 34, such as range checking to remove outliers. The PES signal 38 output by the firmware 36 is processed by the servo accelerator task objects 40 which include a control algorithm 42 that implements suitable compensation filtering, such as a proportional-integral-derivative (PID) control. Sensor signals 44 (e.g., linear and rotational sensors) are also filtered 46 by a servo accelerator task object to compensate for external disturbances to the disk drive. A final control effort (FCE) 48 scales the output of the control algorithm 42, the filters 46, and the PES signal 38 to generate an FCE signal 50. The FCE signal 50 is further filtered 52 (e.g., using a notch filter task object) to generate the actuator control signal. A state estimator 54 processes the actuator control signal and the PES signal 38 to estimate one or more states 56 of the servo control system which are processed by the firmware, for example, to range check the input PES signal 34.

Figure 3:
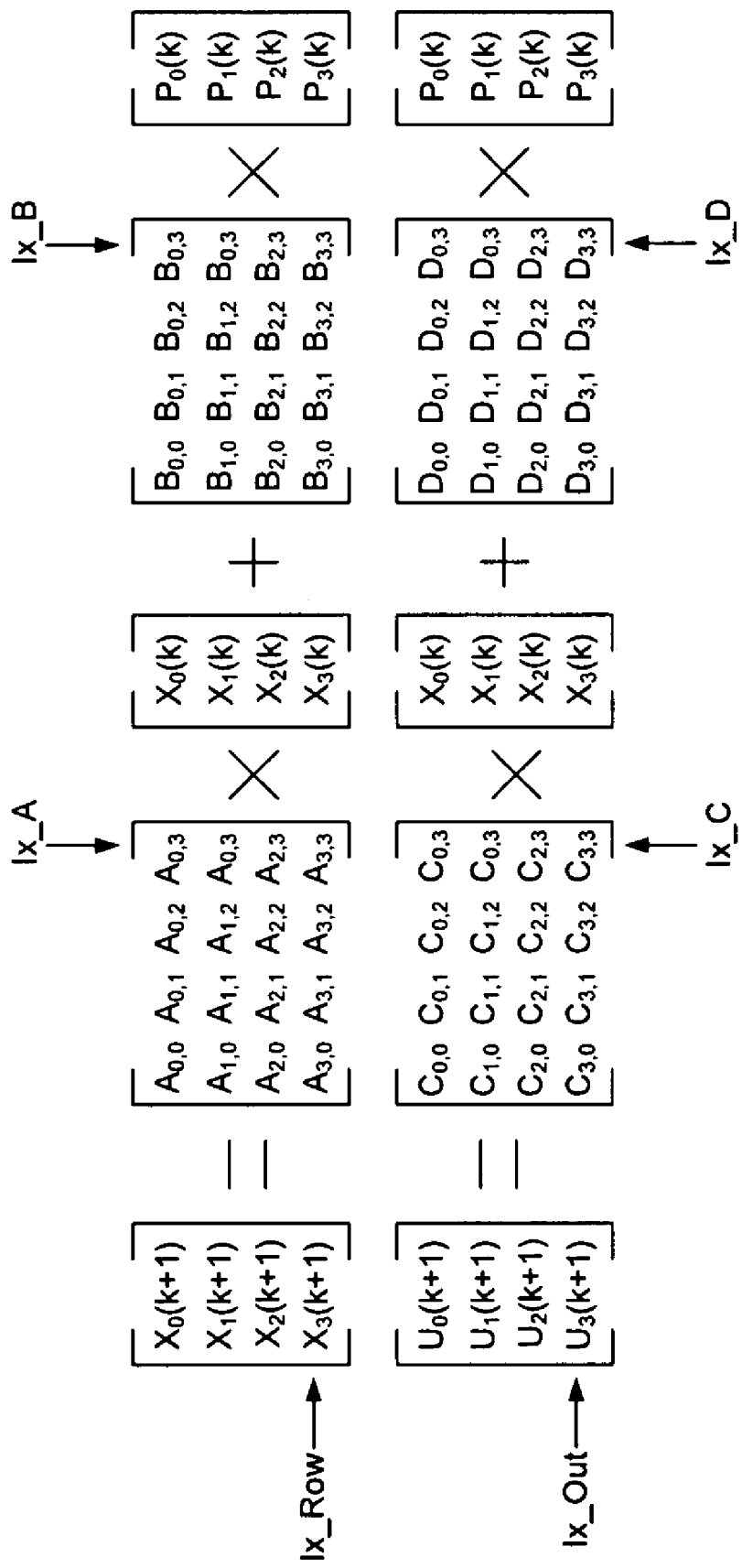
FIG. 3 illustrates an embodiment of the present invention wherein the state variables and coefficients of the servo accelerator implement state space algorithms.

In one embodiment, the algorithms implemented by the servo accelerator task objects of FIG. 2 are implemented using state space equations wherein the variables are expressed as vectors and the differential and algebraic equations are written in matrix form:

$$X(k+1) = A(k) \cdot X(k) + B(k) \cdot P(k)$$

$$U(k+1) = C(k) \cdot X(k) + D(k) \cdot P(k)$$

where $X(k)$ is a state vector, $U(k)$ is an output vector, $P(k)$ is an input vector, $A(k)$ is a state matrix, $B(k)$ is an input matrix, $C(k)$ is an output matrix, and $D(k)$ is a feedforward matrix. FIG. 3 illustrates the above state space equations which can be used to implement any linear algorithm (referred to as a task object), such as a PID control algorithm, any suitable filtering (e.g., a notch filter), as well as a state estimator.

Figure 4:
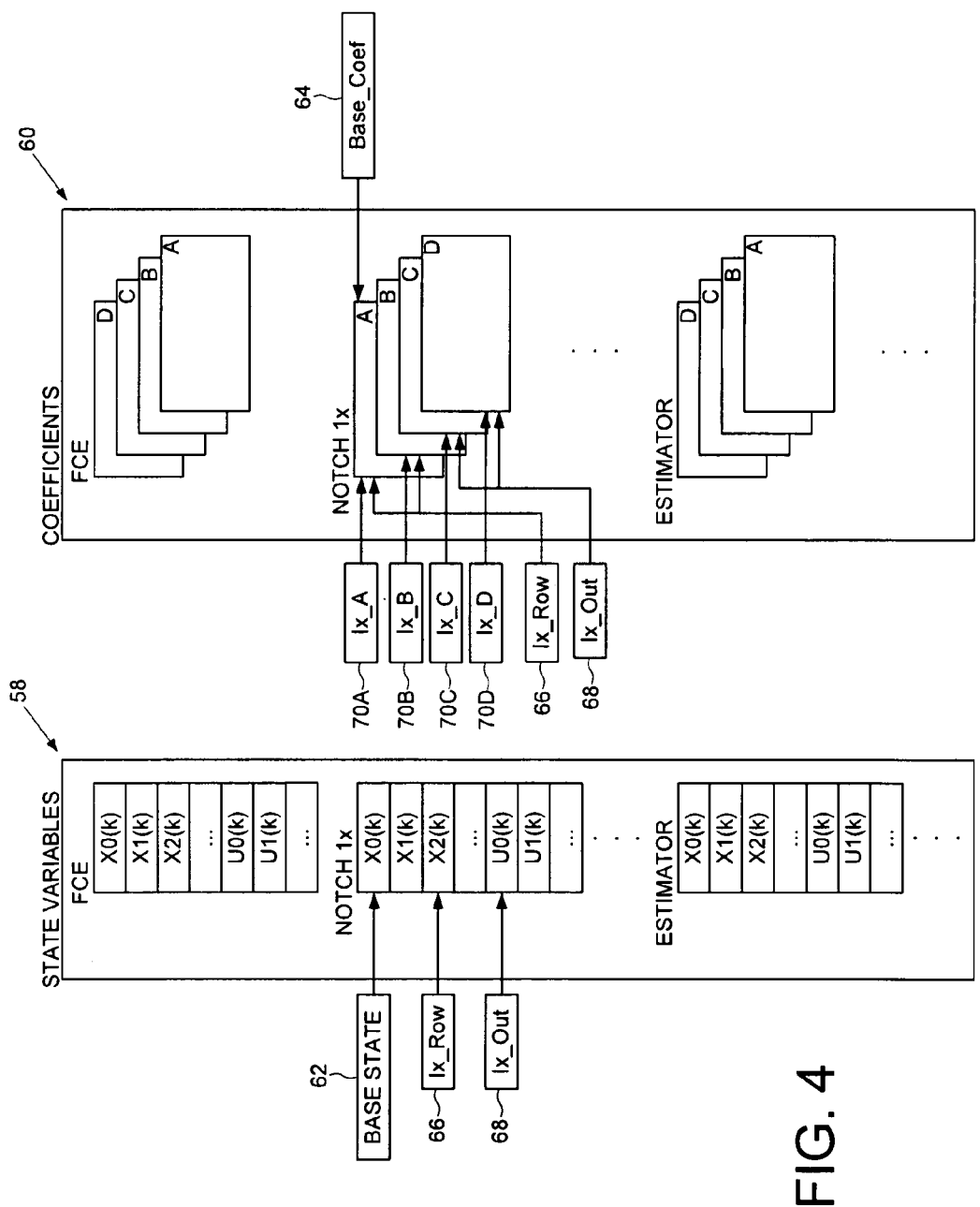
FIG. 4 illustrates an embodiment of the present invention wherein a set of state variables and a set of coefficients are used to implement each state space algorithm.

In an embodiment illustrated in FIG. 4, the servo accelerator comprises a state variable memory 58 for storing a plurality of state variable sets, wherein each state variable set comprises a plurality of state variables and each state variable set corresponds to a task object (e.g., PID control, filter, state estimator, etc.). In addition, the servo accelerator comprises a coefficient memory 60 for storing a plurality of coefficient sets, wherein each coefficient set comprises a plurality of coefficients and each coefficient set corresponds to a task object. When the head reads one of the servo sectors $20_0$-$20_N$, an input vector $P(k)$ is generated representing various input states of the system, such as a PES sample, sensor input, etc. The task objects of the servo accelerator (such as shown in FIG. 2) are executed in a predetermined sequence to generate the actuator control signal corresponding to the servo wedge.

To execute one of the task objects, the control circuitry initializes a base state register 62 to address a selected one of the state variable sets in the state variable memory 58, and initializes a base coefficient register 64 to address a selected one of the coefficient sets in the coefficient memory 60. The control circuitry uses a row register 66 together with the base state register 62 to read the state variables from the state variable memory 58 and the corresponding coefficients from the coefficient memory 60 associated with the task object. The control circuitry also uses an output register 68 to read the output values and corresponding coefficients from the coefficient memory 60. The control circuitry uses a plurality of column registers 70A-70D to address a column of each matrix in the selected coefficient set.

The control circuitry increments the row and column registers in order to read the appropriate state variables and coefficients which are processed by a multiply/accumulate circuit in order to implement the state space equation of the task object. When the current task object has finished executing, the control circuitry executes the next task object by initializing the base state register 62 and the base coefficient register 64 to point to the next set of state variables and coefficients as shown in FIG. 4. In this embodiment, each task object maintains a private memory space in the state variable memory 58 and the coefficient memory 60 which is independent from and inaccessible by other task objects.

Figure 5:
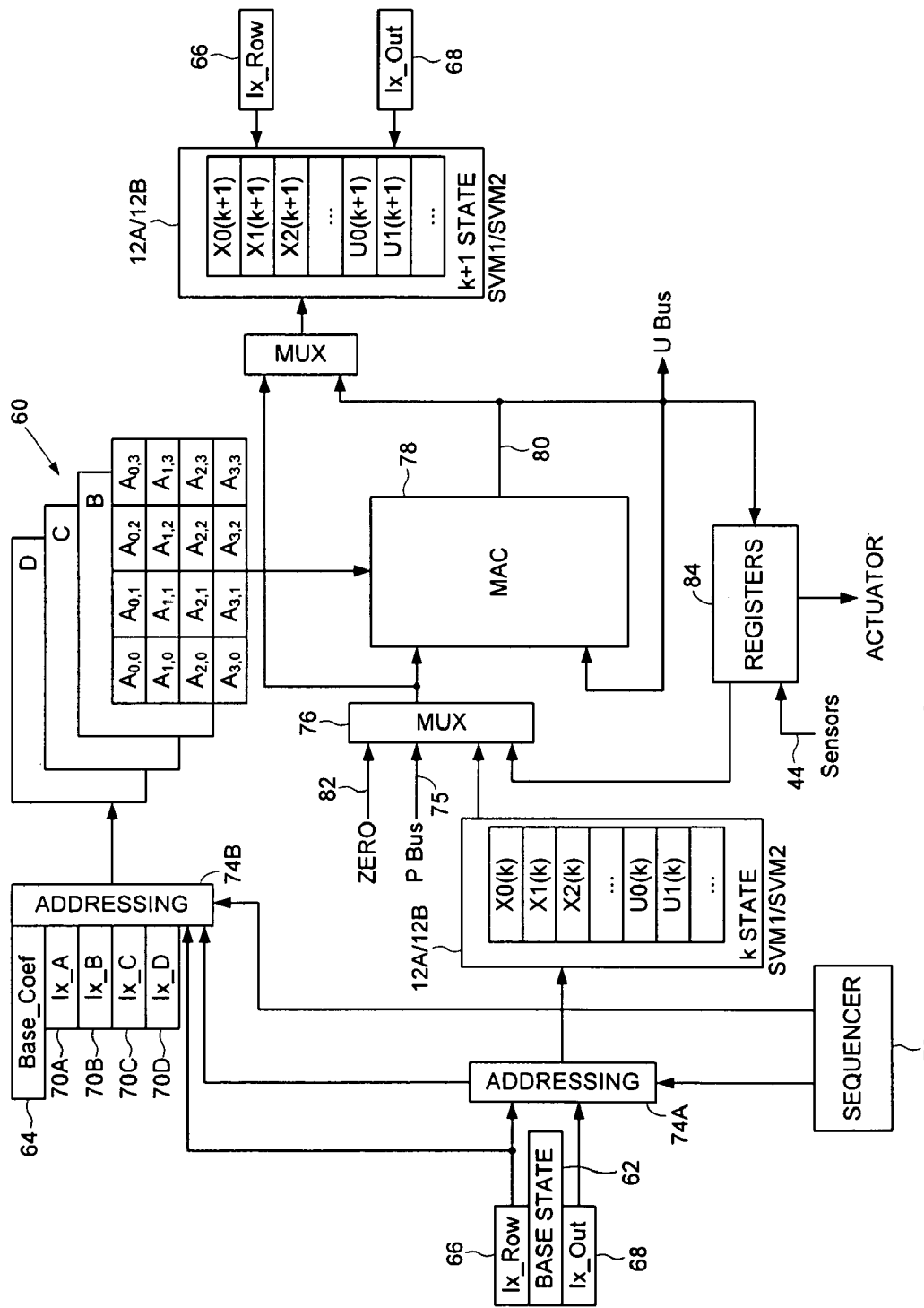
FIG. 5 shows circuitry according to an embodiment of the present invention for implementing the servo accelerator, including a sequencer, state variable memories and base state register for indexing the state variable memories, coefficient memories and a base coefficient register for indexing the coefficient memories, and a multiply/accumulate circuit (MAC).

FIG. 5 shows example control circuitry for implementing the servo accelerator task objects, including the first and second state variable memories 12A/12B for storing the state variable vector $X(k)$ and the output vector $U(k)$ for each task object, and the coefficient memory 60 for storing the coefficients representing the A, B, C and D matrices for each task object. The control circuitry includes a sequencer 72 which loads the base state register 62 and the base coefficient register 64 with values that correspond to the task object to be executed. The sequencer 72 also loads and updates the row pointers 66 and 68 and the column pointers 70A-70D which are then selected through addressing circuitry 74A and 74B in order to read state variables from the state variable memory and to read coefficients from the coefficient memory that correspond to the task object algorithm. New input data (e.g., a PES signal sample) may also be input via a P Bus 75. The sequencer 72 selects via a multiplexer 76 the appropriate value as an input into a multiply/accumulate circuit (MAC) 78 which multiplies the input value by the corresponding coefficient, adds the result to an accumulation, and the result 80 is fed back into the MAC 78 to update the accumulation for the next computation. In the embodiment of FIG. 5, the MAC 78 may be initialized by selecting a zero value 82 as the input to the MAC 78. A number of registers 84 store the output 80 of the MAC 78 which ultimately gets output as the actuator control signal. The registers 84 also receive the sensor inputs 44 which is then input into the MAC 78 via the multiplexer 76 at the appropriate time when the corresponding task object is being executed.

In the embodiments shown in FIG. 1D and FIG. 5, there are two sets of state variable memories SVM1 12A and SVM2 12B for each task object shown in FIG. 4 which facilitates updating the state variables from a current state to the next state. For example, if SVM1 12A stores the values for the current state, the values for the next state (including the output vector $U(k)$) are stored in SVM2 12B. The address circuitry for accessing the SVM is then toggled so that the values stored in SVM2 12B become the current state, and the values for the next state are stored in SVM1 12A.

Any suitable technique may be employed to switch the addressing between SVM1 12A and SVM2 12B, wherein a demultiplexer 86 shown in FIG. 1D is configured by a state signal K/K+1 88 depending on which state variable memory stores the current state, and which state variable memory is to store the next state. A memory address 10 also configures the demultiplexer 86 to select the appropriate input to the SVM and the appropriate output of the SVM at the appropriate time. For example, if SVM1 12A stores the current state values, then the memory address 10 configures multiplexer 90 to select the values stored in SVM1 12A (as well as the next input value N1) as the input to the MAC 78. While the MAC 78 is processing the current state values, the current state values are also stored back into the SVM (SVM2 12B). The memory address 10 configures the demultiplexer 86 to store the output 80 of the MAC 78 to SVM2 12B. The state signal K/K+1 88 is then toggled so that the current state variables are the values stored in SVM2 12B, and the values for the next state variables are stored in SVM1 12A.

Figure 6A:
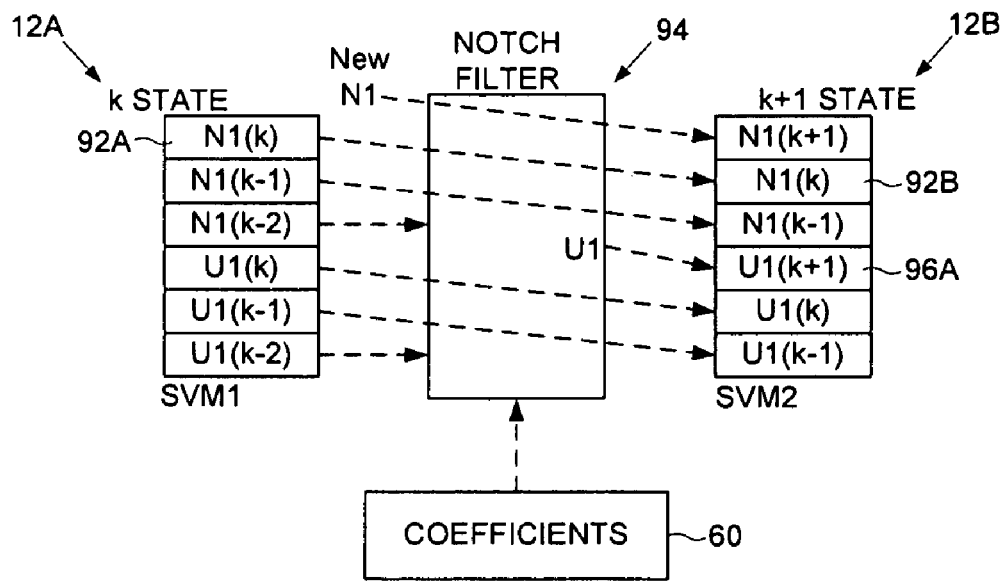
FIGS. 6A and 6B show an embodiment of the present invention wherein the servo accelerator implements a notch filter by swapping state variable memories to facilitate the state progression.

FIG. 6A illustrates an example embodiment of the present invention wherein the servo accelerator is used to implement a notch filter (e.g., filter 52 of FIG. 2) which may filter the output 50 of the final control effort 48. The control circuitry generates the output U1 of the notch filter by assigning the memory address 10 (FIG. 1D) to SVM1 12A. The memory address 10 is used to read a first state k variable 92A from the SVM1 12A (e.g., a previous input N1($k$)) and to store the first state k variable 92B in SVM2 12B while processing 94 the first state k variable 92A to generate a first state k+1 variable 96A (e.g., output U1($k$+1)). In one embodiment, each of the state variables in SVM1 12A of FIG. 6A are processed seriatim by the MAC 78 to generate the first state (k+1) variable 96A. The first state k+1 variable 96A is then stored in SVM2 12B as shown in FIG. 6A.

Figure 6B:
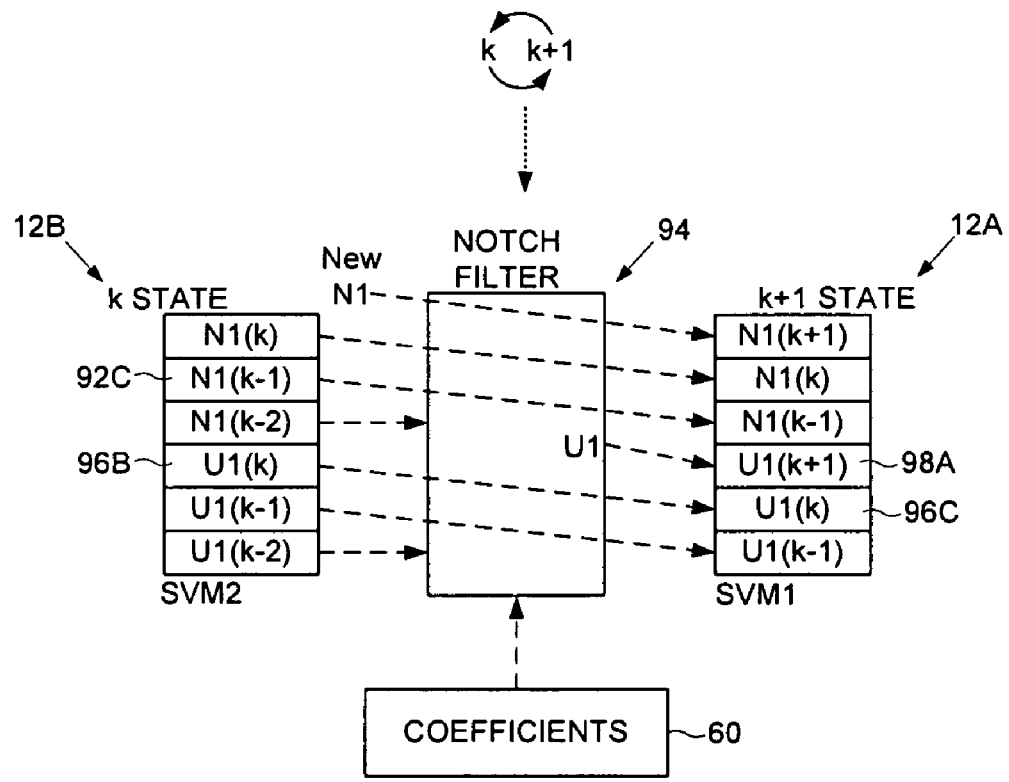

Thereafter, the memory address 10 is assigned to SVM2 12B so that the first state k+1 variable 96A becomes a second state k variable 96B and the first state k variable 92A becomes a first state k−1 variable 92C as illustrated in FIG. 6B. The memory address is then used to read the second state k variable 96B and the first state k−1 variable 92C from the SVM2 12B (FIG. 6B) and to store the second state k variable 96C in SVM1 12A while processing the second state k variable 96B and the first state k−1 variable 92C to generate a second state k+1 variable 98A (e.g., output U1($k$+1) of FIG. 6B). The second state k+1 variable 98A is also stored in SVM1 12A as shown in FIG. 6B. Thereafter, the memory address 10 is assigned to SVM1 12A so that the second state k+1 variable 98A becomes a third state k variable and so on.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

What is claimed is:

1. A disk drive comprising:
   a disk;
   a head;
   an actuator for actuating the head over the disk;
   a state variable memory for storing a plurality of state variable sets, wherein each state variable set comprises a plurality of state variables and each state variable set corresponds to a task object;
   a coefficient memory for storing a plurality of coefficient sets, wherein each coefficient set comprises a plurality of coefficients and each coefficient set corresponds to a task object; and
   control circuitry operable to execute one of the task objects to generate an actuator control signal by:
   initializing a base state register to address a selected one of the state variable sets in the state variable memory;
   initializing a base coefficient register to address a selected one of the coefficient sets in the coefficient memory;
   using the base state register to read a first state variable from the selected state variable set;
   using the base coefficient register to read a first coefficient from the selected coefficient set; and
   using a multiply/accumulate circuit to multiply the first state variable by the first coefficient.

2. The disk drive as recited in claim 1, wherein each coefficient set comprises a matrix of coefficients.

3. The disk drive as recited in claim 2, wherein the control circuitry is further operable to execute one of the task objects to generate the actuator control signal by:
   initializing a row register to address a row of the selected state variable set and a corresponding row of the selected coefficient set; and
   initializing a column register to address a column of the selected coefficient set.

4. The disk drive as recited in claim 1, wherein each coefficient set comprises a plurality of matrices of coefficients.

5. The disk drive as recited in claim 4, wherein each coefficient set comprises an A matrix, a B matrix, a C matrix, and a D matrix.

6. The disk drive as recited in claim 5, wherein the control circuitry is further operable to execute one of the task objects to generate the actuator control signal by:
   initializing a row register to address a row of the selected state variable set and a corresponding row of at least one matrix in the selected coefficient set; and
   initializing at least one column register to address a column of a matrix in the selected coefficient set.

7. The disk drive as recited in claim 1, wherein the control circuitry is further operable to execute one of the task objects to generate the actuator control signal by initializing an output register to address an area of the state variable memory for storing an output of the multiply/accumulate circuit.

8. The disk drive as recited in claim 1, wherein the actuator comprises a voice coil motor.

9. The disk drive as recited in claim 8, wherein the actuator comprises a piezoelectric actuator.

10. A method of generating an actuator control signal in a disk drive, the disk drive comprising a disk, a head, and an actuator for actuating the head over the disk, the method comprising:
   initializing a base state register to address a selected one of a plurality of state variable sets in a state variable memory;
   initializing a base coefficient register to address a selected one of a plurality of coefficient sets in a coefficient memory;
   using the base state register to read a first state variable from the selected state variable set;
   using the base coefficient register to read a first coefficient from the selected coefficient set; and
   multiplying the first state variable by the first coefficient.

11. The method as recited in claim 10, wherein each coefficient set comprises a matrix of coefficients.

12. The method as recited in claim 11, further comprising:
initializing a row register to address a row of the selected state variable set and a corresponding row of the selected coefficient set; and
initializing a column register to address a column of the selected coefficient set.

13. The method as recited in claim 10, wherein each coefficient set comprises a plurality of matrices of coefficients.

14. The method as recited in claim 13, wherein each coefficient set comprises an A matrix, a B matrix, a C matrix, and a D matrix.

15. The method as recited in claim 14, further comprising:
initializing a row register to address a row of the selected state variable set and a corresponding row of at least one matrix in the selected coefficient set; and
initializing at least one column register to address a column of a matrix in the selected coefficient set.

16. The method as recited in claim 10, further comprising initializing an output register to address an area of the state variable memory for storing an output of the multiplication.

17. The method as recited in claim 10, wherein the actuator comprises a voice coil motor.

18. The method as recited in claim 17, wherein the actuator comprises a piezoelectric actuator.

* * * * *